(12) United States Patent
Hussa

(10) Patent No.: US 10,509,440 B2
(45) Date of Patent: *Dec. 17, 2019

(54) BENDABLE DISPLAY ASSEMBLY

(71) Applicant: Microsoft Technology Licensing, LLC, Redmond, WA (US)

(72) Inventor: Esa Hussa, Lempäälä (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,773

(22) Filed: Jun. 12, 2017

(65) Prior Publication Data

US 2017/0277226 A1   Sep. 28, 2017

Related U.S. Application Data

(63) Continuation of application No. 14/613,126, filed on Feb. 3, 2015, now Pat. No. 9,684,339.

(51) Int. Cl.
| | |
|---|---|
| *G06F 1/16* | (2006.01) |
| *B32B 3/06* | (2006.01) |
| *B32B 3/08* | (2006.01) |
| *B32B 7/14* | (2006.01) |
| *B32B 37/14* | (2006.01) |

(Continued)

(52) U.S. Cl.
CPC ............ *G06F 1/1652* (2013.01); *B32B 3/06* (2013.01); *B32B 3/08* (2013.01); *B32B 7/14* (2013.01); *B32B 37/14* (2013.01); *G02F 1/133305* (2013.01); *G02F 1/133308* (2013.01); *H04M 1/0268* (2013.01); *B32B 2255/26* (2013.01); *B32B 2457/20* (2013.01); *G02F 2001/133322* (2013.01); *G02F 2201/50* (2013.01)

(58) Field of Classification Search
CPC ...................................................... G06F 1/1652
USPC ............................................................. 428/69
See application file for complete search history.

(56) References Cited

U.S. PATENT DOCUMENTS

| | | | |
|---|---|---|---|
| 4,375,018 A | 2/1983 | Petersen | |
| 6,639,578 B1 | 10/2003 | Comiskey et al. | |

(Continued)

FOREIGN PATENT DOCUMENTS

| | | | |
|---|---|---|---|
| CN | 203786693 U | 2/2014 | |
| CN | 103827771 A | 5/2014 | |

(Continued)

OTHER PUBLICATIONS

Zyga, Lisa, "Foldable display shows no crease after 100,000 folding cycles", Published on: May 12, 2011, Available at: http://phys.org/news/2011-05-foldable-crease.html.

(Continued)

*Primary Examiner* — Brent T O'Hern

(57) ABSTRACT

A bendable display assembly comprises a plurality of layered elements each having two side surfaces, each having an area, the elements comprising a display element capable of displaying an adjustable visual output. Two successive elements of the plurality of layered elements have opposite side surfaces facing towards each other, the opposite side surfaces being, for a majority of their areas, in contact with a sealed sliding fluid volume extending between the successive elements, whereby the successive elements are slidably movable relative to each other when the display assembly is bent.

20 Claims, 4 Drawing Sheets

(51) Int. Cl.
*H04M 1/02* (2006.01)
*G02F 1/1333* (2006.01)

(56) References Cited

U.S. PATENT DOCUMENTS

| | | |
|---|---|---|
| 6,655,788 B1 | 12/2003 | Freeman |
| 7,688,497 B2 | 3/2010 | Danner et al. |
| 8,034,209 B2 | 10/2011 | Danner et al. |
| 8,268,655 B2 | 9/2012 | Chen et al. |
| 8,498,042 B2 | 7/2013 | Danner et al. |
| 8,551,603 B2 | 10/2013 | Thompson |
| 8,787,016 B2 | 7/2014 | Rothkopf et al. |
| 8,830,553 B2 | 9/2014 | Patry et al. |
| 9,684,339 B2 * | 6/2017 | Hussa .................. G06F 1/1652 |
| 2003/0184704 A1 * | 10/2003 | Akiyama .......... G02F 1/133305 349/158 |
| 2007/0152956 A1 | 7/2007 | Danner et al. |
| 2010/0164888 A1 | 7/2010 | Okumura et al. |
| 2010/0238098 A1 | 9/2010 | Watanabe |
| 2011/0043479 A1 | 2/2011 | Van Aerle et al. |
| 2011/0188189 A1 | 8/2011 | Park et al. |
| 2012/0081874 A1 | 4/2012 | Wu et al. |
| 2012/0098739 A1 | 4/2012 | Hsieh et al. |
| 2012/0241889 A1 | 9/2012 | Takemura et al. |
| 2013/0222416 A1 | 8/2013 | Kim et al. |
| 2013/0300677 A1 | 11/2013 | Kim et al. |
| 2014/0043734 A1 | 2/2014 | Kim et al. |
| 2014/0104202 A1 | 4/2014 | Choi et al. |
| 2014/0115884 A1 | 5/2014 | Danner et al. |
| 2014/0267950 A1 | 9/2014 | Kang et al. |
| 2014/0268595 A1 | 9/2014 | Eom et al. |

FOREIGN PATENT DOCUMENTS

| | | |
|---|---|---|
| EP | 1038663 A2 | 9/2000 |
| JP | 2002341792 A | 11/2002 |
| JP | 2006106603 A | 4/2006 |
| WO | 2004003645 A1 | 1/2004 |
| WO | 2011119180 A1 | 9/2011 |
| WO | 2014007528 A1 | 1/2014 |
| WO | 2014154933 A1 | 10/2014 |

OTHER PUBLICATIONS

Chen, et al., "A Novel Handling Method of Ultra-Thin Flexible Glass Substrate for Thin and Flexible Displays", In Technical Papers of SID Symposium Digest, vol. 44, Issue 1, Jun. 2013, 2 pages.

"International Search Report and Written Opinion Issued in PCT Application No. PCT/US2016/015490", dated Apr. 13, 2016, 12 Pages.

"Second Written Opinion Issued in PCT Application No. PCT/US2016/015490", dated Dec. 15, 2016, 10 Pages.

"Non-Final Office Action Issued in U.S. Appl. No. 14/613,126", dated Oct. 19, 2016, 12 Pages.

"Notice of Allowance Issued in U.S. Appl. No. 14/613,126", dated Feb. 15, 2017, 8 Pages.

"International Preliminary Report on Patentability Issued in PCT Application No. PCT/US2016/015490", dated Apr. 12, 2017, 11 Pages.

"First Office Action and Search Report Issued in Chinese Patent Application No. 201680008573.6", dated Jul. 32, 2019, 15 Pages.

* cited by examiner

BENDABLE DISPLAY ASSEMBLY

CROSS-REFERENCE TO RELATED APPLICATIONS

This application is a continuation of U.S. application Ser. No. 14/613,126, filed on Feb. 3, 2015, which is hereby incorporated by reference herein in its entirety for all intents and purposes.

BACKGROUND

Various devices incorporate displays for displaying information. Such display may be an interactive, touch sensitive display providing also a user interface of the mobile device. It may be desirable that the display is bendable so as to allow bending or folding, preferably repeatedly, of the device incorporating the display assembly.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although some of the present examples are described and illustrated herein as being implemented in or for a smartphone or a mobile phone, these are only examples of a bendable mobile device and not a limitation. The present examples are suitable for application in a variety of different types of devices, especially mobile devices, for example, in tablet computers, game consoles or game controllers, various types of wearable mobile electronic devices, etc. A display assembly may have a layered configuration wherein a plurality of display elements are superposed on each other to form a stack of elements. In a bendable display assembly, the attachment of the elements to each other and/or to the other parts of the display assembly may affect the bendability of the display assembly and/or the durability thereof under bending.

Figure 1:
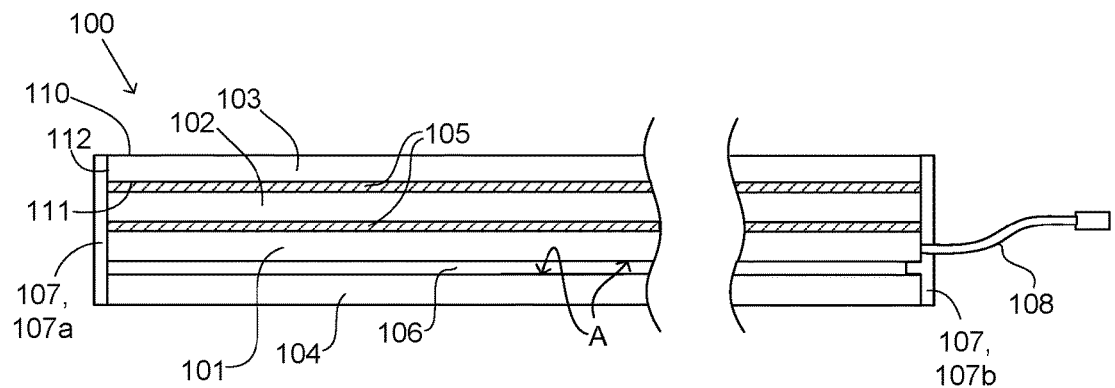
FIG. 1 shows a schematic, partial cross sectional view of a bendable display assembly.

FIG. 1 shows a part of a bendable display assembly 100 as an example of bendable display assembly comprising a plurality of layered elements each having two side surfaces, each having an area A, and a peripheral edge surface connecting the two side surfaces, the elements comprising a display element 101 capable of displaying an adjustable visual output; wherein two successive elements of the plurality of layered elements have opposite side surfaces facing towards each other, the opposite side surfaces being, for a majority of their areas, in contact with a sealed sliding fluid volume extending between the successive elements, whereby the successive elements are slidably movable relative to each other when the display assembly is bent.

By the "area" of a side surface is meant here not any partial "region" of such surface, but the surface area of the entire side surface.

By "display assembly" is meant in this specification generally an assembly with generally layered configuration, comprising an electronic display element capable of displaying an adjustable visual output to the outside of the display assembly. A display assembly may be a stand-alone, operable display, display module, or display panel, to be integrated as part of a bendable electronic mobile device, such as a mobile phone, s smart phone, a tablet computer, a laptop computer, game controller, some wearable electronic device, etc. On the other hand, it may require some further elements to be connected to it before it may operate as a display.

By adjustable visual output is meant that instead of, or in addition to, merely presenting some static graphics or images, the information content displayed by means of the visual output may be changed. By being capable of providing the adjustable visual output or information is meant that the display element is a complete, operable display element in the sense that it may comprise all necessary sub-elements to generate the text, graphics, and/or images to be displayed. Thus, if the display element is based on a display technology necessitating several operational layers, the display element may comprise all the layers necessary for forming the displayed information. The control of the display element may be carried out by elements and components lying outside the display element. Control signals and power may be supplied to the display element e.g. by appropriate wirings and cables.

The display element may be based on any appropriate electric or electronic display technology, including, for example, LCD (Liquid Crystal Display), OLED (Organic Light-Emitting Diode), and AMOLED (Active-Matrix Organic Light-Emitting Diode), graphene-based displays, and any of their variants.

The display assembly may be configured so that it can operate as, or as a part of, a passive display element for presenting information one-directionally only, without any interactivity. The display assembly may also be implemented as an assembly for an interactive display, operable e.g. by touching it or interacting with it using a stylus. Such touch display or touch screen, capable of providing a touch based user interface, may be based on any appropriate touch/stylus sensing technology, such as capacitive and resistive technologies and their variants.

In addition to the display element, a display assembly may comprise several other structural and/or operational elements. The example display assembly 100 of FIG. 1 comprises a touch sensitive element 102 and, as an outermost element on the side of the display assembly to which the information is to be displayed, a protective element 103 which may be formed e.g. of some optically sufficiently transparent plastic material, e.g. polyethylene terephthalate PET, or of a glass. The display assembly of FIG. 1 is thus designed for use as or in a touch operable display, i.e. a touch screen or a touch display. The touch sensitive element may itself comprise several sub-layers and it may be based on any known touch sensing technology being based on e.g. capacitive or resistive touch sensing principles. The protective layer may protect the underlying layers from damages.

On the side opposite to the side to which the display is to be displayed, the display assembly comprises a support element 104 which may be implemented e.g. as a thin metallic support sheet. The support element may protect the display element as well as provide a connection interface via which the display assembly may be attached to external structure e.g. of a mobile electronic device.

Each of the elements has a first and an opposite second side surface 110, 111 facing to the opposite sides of the element. These side surfaces are connected via a peripheral edge surface 112 defining an edge periphery of the element. In FIG. 1, those surfaces are specifically marked for the protective element 103, but each of the elements has corresponding side and peripheral edge surfaces. Each two successive elements, i.e. elements lying on each other, then have two opposite side surfaces facing towards each other.

The elements of the display assembly of FIG. 1 are mere examples of possible elements. In general, a bendable display assembly may comprise any appropriate number, as long as it is at least two, and any appropriate types of elements layered as an element stack as long as the elements include at least one display element.

In FIG. 1 and also in the other figures, the elements are illustrated schematically as having a constant thickness until the edges of the plate, so that the peripheral edge surface extends perpendicularly to the side surfaces. However, it is possible that at an edge of an element, the thickness of the element is gradually decreased so that so that the peripheral edge actually forms, for example, a rounded edge surface or just a substantially sharp edge line between the two side surfaces contacting each other.

As illustrated in FIG. 1, the elements of the layered display assembly are layered in the sense that they lie on top of each other, thereby forming a stack of elements. Those elements could thus also be called "layers". Each of the elements or layers is formed as a generally sheet-like or plate-like structure having a width substantially higher than a thickness in a direction perpendicular to the direction in which the width is defined, i.e. in a "perpendicular" or "vertical" direction. In practice, the width, or more generally the lateral dimensions, may be e.g. in the range of some centimeters to some tens of centimeters. Instead, the thickness of each element may be e.g. some tens of micrometers. For example, the protective glass sheet may have a thickness of 50 to 100 micrometers, e.g. about 75 micrometers, and the display element and the touch sensing layer may have thicknesses of about 50 micrometers. The overall thickness of the display assembly may be e.g. less than 500 micrometers. However, those numbers are merely exemplary and the scope of this specification is not limited to any specific thicknesses of the display assembly elements.

The display element 101 is attached to the touch element 102 by means of an adhesive layer 105 therebetween. The adhesive layer may comprise any known adhesive material suitable for attaching together elements layers of a layered bendable display assembly. The adhesive material may comprise e.g. some optically clear adhesive OCA, liquid optically clear adhesive LOCA, or optically clear resin OCR composition. Corresponding attachment by means of an adhesive layer is provided between the touch element 102 and the protective element 103. Alternatively, in some applications, a protective element may be attached to an underlying display assembly element by means of a bonding technique, e.g. by vacuum bonding.

The connection between the display element 101 and the support element 104 is arranged differently. Instead of an adhesive layer, the opposite side surfaces of these two successive elements, facing towards each other, are free of any adhesive. There is a gap 106 between those elements, forming a volume comprising, possibly being completely filled with, a sliding fluid which may be a liquid or a gas. So, those opposing side surfaces of the support sheet and the display element are in contact with this sealed sliding fluid volume, actually forming a sliding layer between those two successive elements, and the sliding fluid therein. The opposite surfaces being in contact with the sliding fluid volume and slidably movable relative to each other means, on the other hand, that the opposing side surfaces of the display element and the support sheet are substantially free of any direct, fixed mechanical attachment therebetween.

The sliding fluid may be any agent suitable for allowing said sliding movement. Advantageously, it may be selected to avoid fixing the lateral position of one of the two successive elements relative to the other one in a way which is the case e.g. when two successive elements are attached together by means of an adhesive. On the other hand, it may advantageously decrease the friction between the opposite side surface of the two successive elements in comparison to a situation where those opposite side surfaces would be, for their entire areas, in direct contact with each other. Thereby, the sliding fluid may serve as a lubricant between the two successive elements.

In the case of a liquid as the sliding fluid, the liquid between the opposite side surfaces of the two successive members may serve for preventing the two successive members from receding from each other, while allowing said sliding movement of those opposite surfaces relative to each other.

Being "sealed" means here that the sliding fluid volume is closed so tightly that sliding fluid can be kept within the sliding fluid volume, and that the sliding fluid may have an inner pressure deviating from the atmospheric or ambient pressure outside the display assembly.

To provide said sealing effect, the display assembly comprises a sealing 107 enclosing the sealed sliding fluid volume 106. The sealing may extend as a continuous circumferential structure around the entire periphery of the display assembly. In other words, the sealing may enclose the entire peripheral edge of the display assembly. The sealing is partially flexible, i.e. reversibly deformable, so that it has a flexible sealing portion 107a so as to allow lateral movement of the edges of the elements, including the successive support sheet and display element, relative to each other, as discussed more closely below in reference to FIG. 2. In the example of FIG. 1, the sealing is attached to the peripheral edge surfaces of the support sheet and the display element as well as the other elements also. Alternatively, the sealing might be attached to some of the elements only.

Being partially flexible means that in the example display assembly of FIG. 1, the sealing also has a rigid sealing portion 107*b* which is substantially rigid with no significant flexibility. In another embodiment, the entire sealing may be flexible.

In the example of FIG. 1, the rigid sealing portion 107*b* extends partially between the support element and the display element. Due to this, the opposite side surfaces of the two successive elements are in contact with the sliding fluid volume for a majority of their areas only. In other words, the sliding fluid volume does not extend to the whole interspace between the successive elements. The portion of the sealing lying in the edge region of the interspace between those two elements may serve for example for keeping those elements appropriately separated at a predetermined distance from each other. However, this is just one example of possible sealing construction variations. It is also possible that the sealing does not extend into any interspace between two successive elements. In such case, the entire areas of the opposite side surfaces may be in contact with the sliding fluid volume. Then, the sliding fluid volume can form a sliding layer covering the entire interspace between the two successive elements.

A connecting element 108, which may comprise e.g. flexible cables and/or a flexible circuit board and one or more connectors, extends from the display element 101 to the exterior of the display assembly through the rigid sealing portion 107*b*. The connecting element serves for forming an electrical connecting interface of the display element, via which power and control signals may be supplied to it. Similar connecting element(s) may be arranged, although not illustrated in FIG. 1, for the touch element, and for any other possible operational element of a display assembly.

In the example of FIG. 1, the sliding fluid volume formed in the gap 106 is arranged between the support sheet and the display element. However other embodiments may exist having a sliding volume arrangement between any two successive elements. There can be also more than one sliding fluid volumes in a display assembly. Further, one single sliding fluid volume may extend between several pairs of elements.

In the example of FIG. 1, the thickness of the gap, or the sliding layer, between the support sheet and the display element is illustrated having a thickness substantially similar to the adhesive layers. Naturally, the thickness of the gap may deviate from that of the adhesive layers. On the other hand, it may be possible that in the case of a sliding layer filled by a gas, the thickness may be lower than in the case of a sliding layer filled by a liquid.

In FIG. 1, the display assembly 100 is in a substantially planar state, in which the assembly in general, and each of the layered elements thereof separately, lies parallel to a plane. However, being "bendable" means that the display assembly is flexible in the sense that it may be bent or folded to deviate from the planar state. In general, "bending" meant in this specification may take place about one single, straight fictitious bending axel, but it may also take place freely three-dimensionally into any three-dimensional shape of the display assembly. Advantageously, the display assembly may be reversibly and repeatedly bendable between a planar state and any bent state, as well as between any different bent states.

A basic requirement for the bendability is that each of the elements of the display assembly is bendable or foldable according to the desired bending or folding properties of the entire display assembly. Moreover, the elements forming the layers of the display assembly are advantageously so connected to each other that when the layered display assembly is bent, i.e. its bending state is changed, the different layers are movable relative to each other, most preferably in the lateral direction, i.e. in a direction parallel to the curved plane in which the bent display assembly extends. Such movements may serve for compensating for the differences in the radius of curvature between the different elements. In the example of FIG. 1, this may be achieved by the adhesive layers having sufficient flexibility or elasticity to allow such movement. Moreover, the sliding fluid volume may further enhance the bendability of the display assembly by alleviating the slidable movement of the display element and the support sheet relative to each other in the lateral direction.

Figure 4:
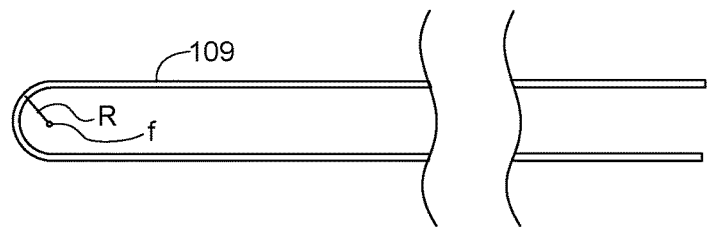
FIG. 4 shows a schematic cross sectional view of one single element for a bendable display assembly.

Bent states, also called bending states, of the display assembly may deviate from a planar state slightly. On the other hand, advantageously, the display assembly may be bendable also so as to deviate severely severely from a planar state. Severe bending in which the bending radius is small with respect to the display assembly thickness may also be called folding. For example, some particularly advantageous effects may be achievable if each of the elements of the display assembly is foldable in two, i.e. into a two-fold state, about a fictitious folding axis with a radius of curvature of less than or equal to 10 mm, e.g. less than or equal to 5 mm. An element 109 folded in two, i.e. so as to have two sections extending in parallel directions or parallel to a single plane, is illustrated in FIG. 4. The radius of curvature, specified as a distance from the folding axis f to the center of the element in the thickness direction thereof is denoted by "R" in the drawing of FIG. 4. A display assembly may also be folded more than in two, i.e., more than 180 degrees. On the other hand, a display assembly may also be bent so as to be rolled along a circular path around a bending axis.

Figure 2:
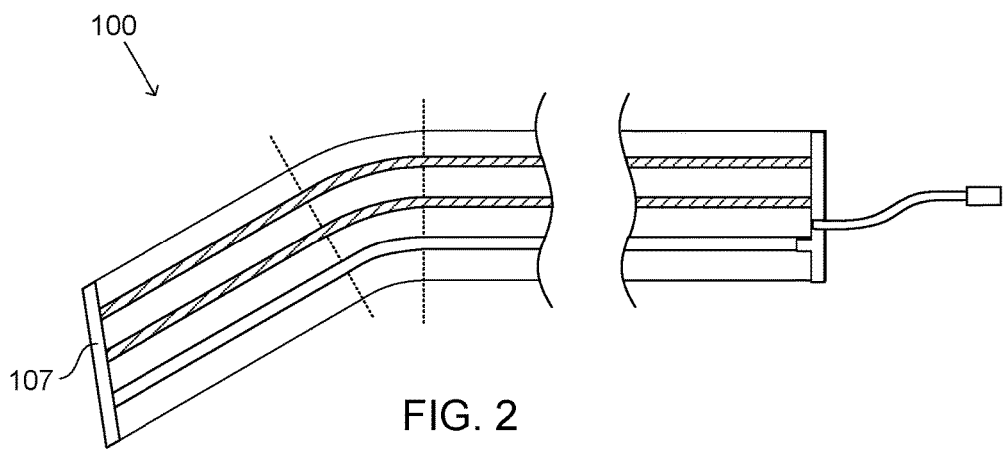
FIG. 2 shows a schematic, partial cross sectional view of the display assembly of FIG. 1 in a bent state.

FIG. 2 shows the display assembly of FIG. 1 when bent to deviate from the planar state illustrated in FIG. 1. In FIG. 2, the bent section of the display assembly is illustrated by dashed lines. Due to the finite thicknesses of the elements and the adhesive layers, the elements have different radii of curvature so that the radii of curvature decrease from the outer side of the bend towards the inner side thereof. Consequently, the bent sections of the different elements and the layers have different lengths, resulting in that outside the bent, the total lengths of the cross-sections, or the widths, of the elements are different.

As shown in the drawing of FIG. 2, at the edge of the display assembly opposite to the edge with the rigid portion of the sealing, the sealing 107 has deformed so as to allow that the edge of each element extends a bit further in the direction along the curved plane in which the element lies than the corresponding edge of the element, if any, above said element. In other words, the edge of an element extends beyond the corresponding edge of the element, if any, above said element. A corresponding edge refers to an edge which lies at the same edge of the assembly as the first mentioned edge of the other element. Thus, when observing two successive elements, e.g. the metallic support sheet and the display element, those layers have moved slidably relative to each other. Sliding movement refers generally to a movement in a lateral direction perpendicular to the thickness of the display assembly, i.e. in the direction of a possibly curved plane along which the display assembly extends at the moment at issue.

Figure 3:
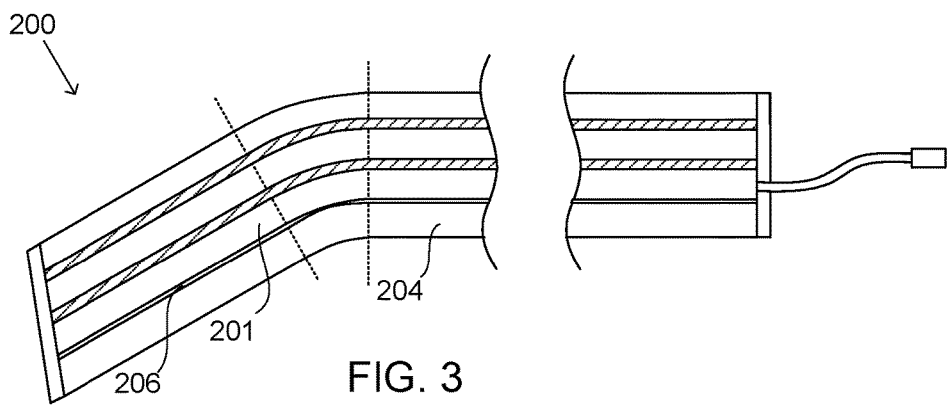
FIG. 3 shows a schematic, partial cross sectional view of a bendable display assembly in a bent state.

The display assembly 200 of FIG. 3 differs from that of FIG. 1 in that the sliding layer formed by the fluid volume 206 thereof is thinner, i.e. it has a thickness which is lower than the thickness of the sliding layer of the display assembly of FIG. 1. As illustrated in FIG. 3, in the region of the bend, the display element 201 and the support sheet 204 have become locally into contact with each other. Thus, the opposing side surfaces of those elements may locally slide along each other, i.e. slide in direct contact with each other. However, this is one possibility only. For example, outside the local contact at the bend, the support sheet and the display element of the example of FIG. 3 are not in direct contact with each other. In general, sliding and slidable movement of two elements relative to each other refers to the concept that two such elements may move laterally relative to each other so that the opposite side surfaces of the elements are not fixed laterally immovably to each other by, for example, some direct attachment. Such elements may be separated from each other, for example, by a sliding fluid volume, or they may lie, at least locally, in direct contact with each other. In another embodiment, one or more local contacts may exist between the two successive elements also with the display assembly in its substantially planar state.

The possibility of two elements being locally in direct contact with each other illustrates the general principle according to which the sliding fluid volume extending "between" such elements does not necessitate that the sliding fluid volume extends everywhere in the interspace between such elements as a continuous layer. Instead, a volume that extends between those elements may be a sliding fluid volume that extends merely through a part of an interspace between two elements. The other way round, it is sufficient for said "extending between" that the opposing side surfaces of the successive elements are at least partially, for a majority of their areas, in contact with the sliding fluid volume.

In some embodiments, two successive elements with a sliding fluid volume extending therebetween may be separated from each other by specific spacers, formed, for example, as small bumps or protrusions, defining a minimum distance between those elements. Such spacers may be separate spacers, located between the elements. They may also be formed as integral spacers at a surface of an element. In the latter case, the elements may thus be in direct contact with each other at the locations of the spacers. On the other hand, at least one of opposing side surfaces of two successive elements may have a surface structuring or roughness making the surface at issue to deviate from a completely smooth one. This may decrease the possibility of those opposing surfaces to become stuck to each other, which might weaken the slidability of the two elements relative to each other.

The sealed sliding fluid volume may comprise any sliding fluid suitable for allowing the sliding movement of two elements of a bendable display assembly relative to each other. In the case of a liquid, it may comprise e.g. silicone oil, paraffin oil, or dimethyl polysilaxine oil. In the case of a gas as the sliding fluid, any gas not harmful for the opposing side surfaces of the display element and the support sheet may be used. One example is nitrogen. In the case in which the opposite surfaces are protected, for example, by a coating against possible harmful effects caused by the sliding fluid, such as oxidation, air can be used.

In the case in which a gas is used as a sliding fluid, the gas in the sealed sliding fluid volume may be arranged to be in a pressure lower than the atmospheric pressure. In other words, the gas may be in vacuum, or more generally, in underpressure. An underpressure may generate a force pulling the two successive elements towards each other, thereby preventing them from receding from each other when the display assembly is bent. In other words, by means of underpressure/vacuum gas in the sliding fluid volume between two successive elements of a layered, the two successive elements may be forced towards each other. The difference to the atmospheric pressure typically present at the outside of the display assembly may vary. In temperatures in the range of 0 to 30° C., the difference can be e.g. 5 to 20% lower than the average atmospheric pressure. Also lower pressures approaching true vacuum are possible. Naturally, the temperature of the gas in the sliding fluid volume affects the pressure in the sliding fluid volume and also the pressure difference to the ambient pressure.

Figure 5:
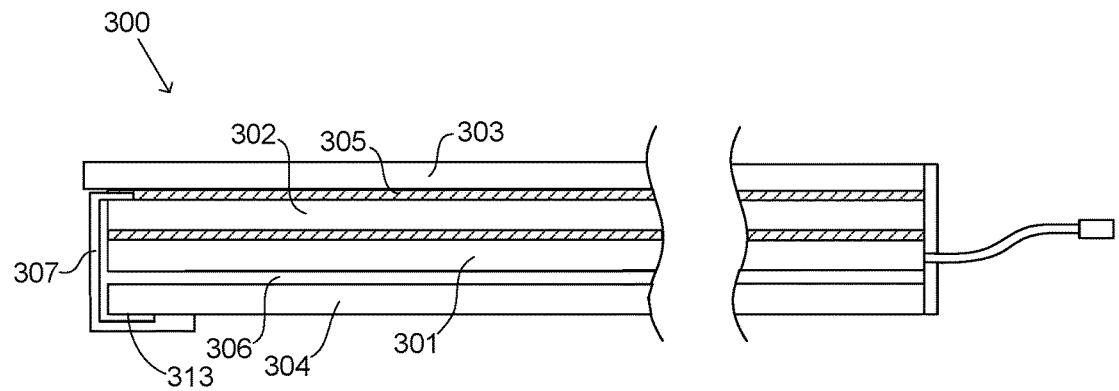
FIG. 5 shows a schematic, partial cross sectional view of a bendable display assembly.

FIG. 5 illustrates a display assembly 300 differing from that of FIG. 1 in that a sealing 307 is attached to the upper side surface of the touch layer 302 and to the lower side surface of the support element in the form of a support sheet 304. The "upper" and "lower" refers here just to the opposite directions to which those surfaces are facing, thus not limiting the direction of the display assembly to any specific directions, although in FIG. 5, those directions are the upwards and the downwards directions. Attached to the touch element 302 by means of a layer 305 of a liquid optically clear adhesive LOCA, there is a protective glass sheet 303, the edge of which extends beyond the edges of the underlying elements. Another LOCA adhesion layer exists between the display element 301 and the touch element 302. The sealing 307 encloses the peripheral edge surfaces of the elements but is separated therefrom by a small distance. At the side of the support sheet, the sealing is attached to the lower side surface of the support sheet at a distance from the edge of the support sheet, thereby defining a free edge region 313 on that surface.

With the sealing arrangement of FIG. 5, the sliding fluid volume 306 enclosed by the sealing 307 extends from between the display element 301 and the support sheet 304 also between the sealing and the peripheral edge surfaces of the display assembly and the touch element 302. It also extends, in the area of the free edge region 313, below to the support sheet.

By an arrangement as that of FIG. 5, the deformability of the sealing may be improved, thereby facilitating the extending of the element edges beyond each other during bending of the display assembly.

Figure 6:
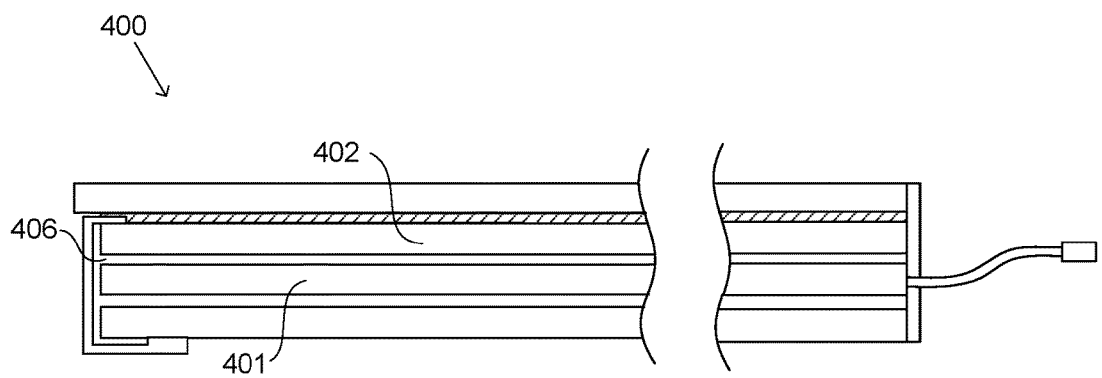
FIG. 6 shows a schematic, partial cross sectional view of a bendable display assembly.

The example display assembly 400 of FIG. 6 differs from that of FIG. 5 in that there is no adhesive layer between the display element 401 and the touch element 402. Instead, the sliding fluid 406 volume extends also between those elements. Thus, also the opposing side surfaces of the successive display element 401 and the touch element 402 are in contact with the sliding fluid volume. This may facilitate the sliding movement of the display element and the touch element relative to each other.

On the other hand, in the arrangement of FIG. 6, the both side surfaces of the display element 401 are in contact with the sliding fluid volume 406. This may facilitate the slidability of the display element relative to both the touch element and the support sheet.

Figure 7:
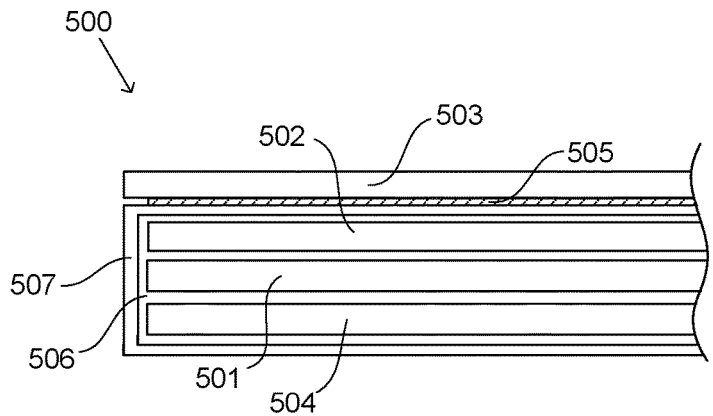
FIG. 7 shows a schematic, partial cross sectional view of a bendable display assembly.

FIG. 7 illustrates yet another example of a sealing 507 enclosing a sliding fluid volume 506 which extends into several interspaces between the elements of a display assembly. The display assembly 500 differs from that of FIG. 6 in that the sealing 507 extends over the entire stack of a display element 501, superposed between a bottom element 504, such as a support sheet, and a touch element 502 so that it encloses the entire outermost side surfaces of the touch element and the bottom element, and also the peripheral edge surfaces of those layers at least at the edge of the display assembly visible in FIG. 7. At the opposite edge, not shown in FIG. 7, there may be a sealing portion attached to the elements, for example, to the peripheral side surfaces thereof similar to the rigid sealing portion of the display assembly example of FIG. 1. Outside the "bag" formed by the sealing 507, there is a protective element 503 attached to the rest of the display assembly by means of a LOCA adhesion layer 505.

In the display assembly examples above, the sealing may be formed of some plastic or elastomer material providing sufficient deformability. Examples of elastomers include synthetic rubber, hydrogenated nitrile butadiene rubber HNBR, latex rubber, silicon rubber, and polyurethane foam.

Figure 8:
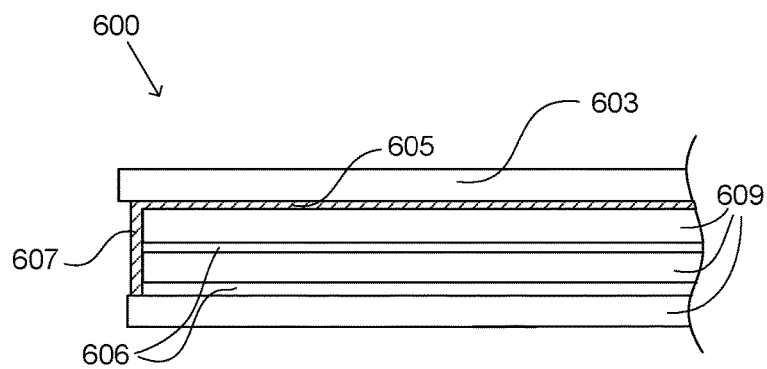
FIG. 8 shows a schematic, partial cross sectional view of a bendable display assembly.

As yet another variation, FIG. 8 illustrates a display assembly 600 where liquid optically clear adhesive LOCA is utilized to form a sealing 607 enclosing two sliding fluid volumes 606 extending into two interspaces of the element layer stack. There is a stack of three elements 609, one of them being a display element, covered by a protective sheet 603 attached to said stack by a layer 605 formed of LOCA. At the edge regions of the display assembly, the LOCA layer extends vertically over the peripheral edge surfaces of the two successive elements, thereby forming a sealing 607 enclosing a sliding fluid volume between the two uppermost elements of the three element stack. The lowermost element extends laterally further than the two other elements. The LOCA layer section is attached to thereby exposed free portion of an upper side surface of this element, thereby enclosing another sliding fluid volume between the two lowermost elements also. Similarly to the sealing of the example of FIG. 1, at an edge region of the display assembly, the sealing formed by the LOCA layer could also extend partially into the interspace(s) between the successive elements 609.

It is to be noted that the support sheet in the above examples is just one possibility for an element lying below the display element. There might be any appropriate element instead of such support element. On the other hand, a touch element may be lacking in a display assembly or it may be integrated into the display element. In general, a display assembly may comprise any appropriate elements arranged in any appropriate order, without being limited to those examples. Just as one example, in some embodiments, the display element may be the lowermost element in the stack.

In the above examples, instead of comprising just a liquid or a gas, the volume(s) may also comprise both liquid and gas. For example, it is possible that between the two successive elements, the volume comprises a liquid, whereas in the portion surrounding the edges of the elements, it may comprise a gas. In such case, the gas may be in atmospheric pressure.

In the above examples, in addition to contributing to the sliding connection between successive elements, the sliding fluid may also affect the optical performance of the display assembly.

In the above examples, the peripheral edge surfaces of the elements may circle the entire circumference of the element at issue. There may be also other embodiments where the "peripheral edge surface" of an element not necessarily continues over the entire circumference of the element at issue. For example, if the layered display assembly is formed by folding a sheet-like preform having initially adjacent elements or element portions which become one on the other when the preform is folded in two, there is not necessarily a peripheral edge surface of such element(s) at the edge thereof lying on the side of the bend of the preform.

Figure 9A:
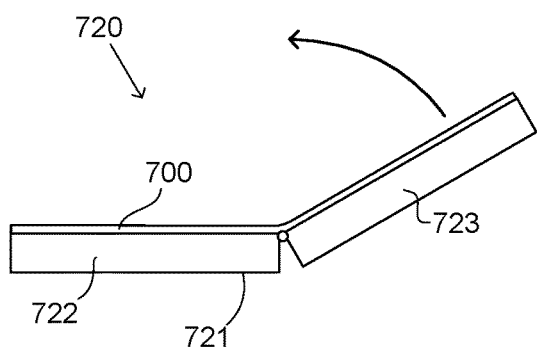
FIGS. 9a and 9b show schematic views of bendable electronic devices with a bendable display assembly.

The example mobile electronic device 720 of FIG. 9A has a foldable casing 721 having two casing portions 722, 723 which are hingedly turnable relative to each other, as illustrated by the arrow indicated in the drawing. A bendable display assembly 700, which may be of any type discussed above, is integrated into the device to serve as a display thereof. The two casing portions itself may be rigid structures.

Figure 9B:
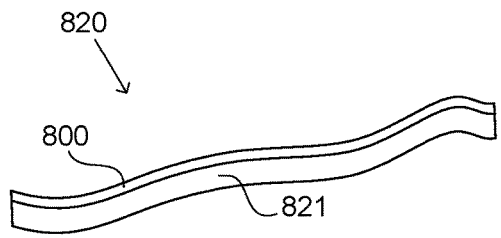

Instead of a two-part foldable casing of the example of FIG. 9A, a bendable mobile electronic device may be implemented as having a freely bendable or foldable structure where the bending or folding properties are not limited to just turnability about a hinge, but where the overall device structure is bendable in any direction(s). A bendable mobile electronic device 820 of this type is shown in FIG. 9B. A bendable display assembly 800, which may be of any type discussed above, is integrated into the device to serve as a display thereof. The device casing 821, as well as the internal structures thereof with various elements and components (not shown) of the device, are bendable in any direction(s).

The mobile electronic devices of FIGS. 9A and 9B may be, for example, smartphones or mobile phones. Alternatively, they may be, for example, tablet computers, game consoles or game controllers. In particular the mobile electronic device of FIG. 9B may also be implemented as a wearable mobile electronic device.

Figure 10:
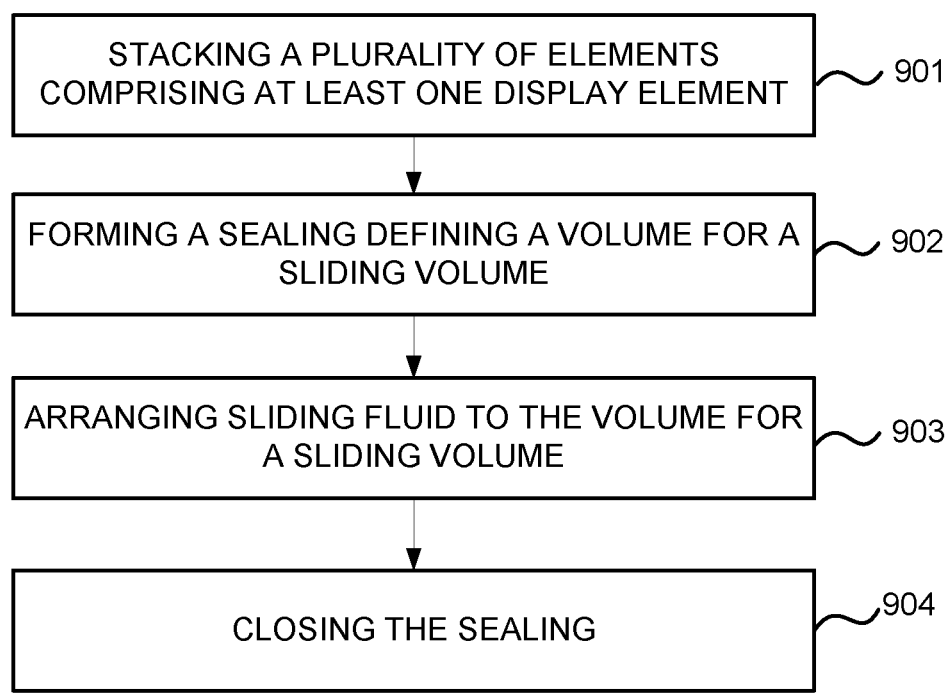
FIG. 10 shows a flow diagram of a manufacturing method.

FIG. 10 illustrates a method for manufacturing a bendable display assembly which may be similar to any of the bendable display assemblies discussed above. What is stated above, in the context of the bendable display assemblies, about the details, the definitions, and the possible advantages, apply, mutatis mutandis, also to the method aspect below.

The method illustrated in FIG. 10 starts by stacking, in step 901, a plurality of elements each having two side surfaces facing to opposite directions and a peripheral edge surface connecting the two side surfaces, the elements comprising at least one display element capable of displaying adjustable information. The elements, their order, and their properties may be selected, for example, according to any of the bendable display assembly examples discussed above.

Separate or integrated spacers, as those discussed above, may be positioned between the successive elements to keep them at a distance from each other. As one example, thin needle-like spacers may be used as temporary spacers to be moved before completing the manufacturing of the display assembly.

Next, in step 902, a sealing is formed, which is attached to at least one of the plurality of elements, the sealing defining, possibly together with one or more of the layered elements, a volume for sliding fluid. The sealing is formed so that the volume thereby defined extends between two successive elements so that opposite side surfaces of those successive elements, the opposite surfaces facing towards each other, are in contact with the volume for sliding fluid. As the bendable display in general, also the sealing thereof may be in accordance of any of the above bendable display examples. When the above temporary spacers are used, they may extend to the outside of the initial sealing to facilitate removal thereof.

The sealing may be left initially locally open, or an opening may be formed in a ready sealing. Sliding fluid is arranged, in step 903, via an opening to the volume for sliding fluid. This may comprise supplying a sliding liquid or gas to the volume for sliding fluid, but also evacuate gas therefrom to arrange a vacuum between the successive elements. By arranging the sliding fluid to said volume, a sliding fluid volume is provided, which enable the successive elements to move slidably relative to each other when the display assembly is bent. Possible temporary spacers may be removed at this stage. Finally, in step 904, the sealing is closed to form a sealed sliding fluid volume.

In forming the sliding fluid volume closed by a sealing, in the case of a vacuum gas as a sliding fluid, principles known e.g. from OLED display panels where there's vacuum between the LTPS (Low Temperature Polycrystalline Silicon) and encapsulation glass may be used, whenever appropriate. Similarly, in forming a liquid volume closed by a sealing, principles known from LCD panels where there's liquid between glass panels may be used, wherever appropriate.

In addition to the example of FIG. 10, also other methods may be used to manufacture a bendable display assembly. For example, in the case of underpressure gas in the volume, the underpressure may be created by the following process steps: 1. Stacking a plurality of elements comprising at least one display element; 2. Forming, in an elevated temperature, a closed sealing defining a volume for a sliding fluid volume (temperature can be for example 70° C.). Then, when the display assembly is cooled into a typical use temperature of the display assembly (e.g. 0-30° C.), there's underpressure in the sliding volume.

In another example, liquid can be applied into a volume by the following process steps: 1. Silk-screen printing the liquid on side surface(s) of two elements; 2. Stacking a plurality of elements comprising at least one display element, wherein said two elements become successive elements with their side surfaces having the printed liquid facing to each other; 3. Forming a closed sealing defining a volume for a sliding volume between the two successive elements.

For attaching a sealing to a display assembly, e.g. to a side surface of an element thereof, various techniques may be used. For example, a film for forming the sealing may be attached by means of heat bonding. In another example, a sealing may be attached to the display assembly by means of a two-sided adhesive. The sealing may also be itself formed of or as an adhesive, e.g. as a two-sided adhesive film. A sealing may also be formed by printing elastic glue on a surface of an element using tampo printing (pad printing) or spraying, wherein the printed glue forms the sealing.

Some aspects of certain embodiments are shortly discussed in the following.

In one aspect, a bendable display assembly comprises a plurality of layered elements each having two side surfaces, each having an area, the elements comprising a display element capable of displaying an adjustable visual output; wherein two successive elements of the plurality of layered elements have opposite side surfaces facing towards each other, the opposite side surfaces being, for a majority of their areas, in contact with a sealed sliding fluid volume extending between the successive elements, whereby the successive elements are slidably movable relative to each other when the display assembly is bent.

In an embodiment, one of the two successive elements is the display element.

In an embodiment, in which one of the two successive elements may be the display element, one of the two successive elements is a metallic support sheet.

In an embodiment, which may be in accordance with any of the preceding embodiments, the sliding fluid volume comprises a liquid. In an embodiment with liquid sliding fluid, the liquid may comprises silicone oil.

In an embodiment, which may be in accordance with any of the preceding embodiments, the sliding fluid volume comprises a gas. In one such arrangement, the sliding fluid volume comprises both liquid and gas. In an embodiment where the sliding fluid volume comprises gas, the gas is in a pressure lower than the atmospheric pressure at least at typical use temperatures of the display assembly.

In an embodiment, which may be in accordance with any of the preceding embodiments, the display assembly comprises spacers between the opposite surfaces of the two successive elements keeping the opposite surfaces separated from each other. Instead of, or in addition to such spacers, one or both of the opposite surfaces may comprise a surface structuring making the surface at issue to deviate from a smooth one.

In an embodiment, which may be in accordance with any of the preceding embodiments, the display assembly comprises a sealing enclosing the sliding fluid volume, the sealing being at least partially flexible to allow an edge of one of the two successive elements to move relative to a corresponding edge of the other one of the two successive elements when the successive elements are slidably moved relative to each other.

In an embodiment in which the display assembly comprises the sealing, each of the two successive elements has a peripheral edge surface connecting the two side surfaces of that element, and the sealing is attached to the peripheral edge surfaces of the two successive elements. In one embodiment with such attachment, the display assembly comprises a layer of liquid optically clear adhesive LOCA, the LOCA layer extending at an edge of the display assembly vertically over the peripheral edge surfaces of the two successive elements, thereby forming the sealing. Alternatively, such LOCA layer may be attached to the peripheral edge surface of one of the successive elements only.

In an embodiment in which the display assembly comprises the sealing, each of the two successive elements has a peripheral edge surface connecting the two side surfaces of that element, and the sealing is attached to a side surface of an element, whereby the opposite peripheral edge surfaces of the two successive elements are in contact with the sliding fluid volume. In an embodiment with such attachment, the sealing is attached to a side surface of an element at a distance from an edge of that element, whereby a free edge region of that side surface is in contact with the sliding fluid volume. In an embodiment with such attachment to a side surface of an element, for example, at a distance from an edge of that element, the sealing is attached to a side surface of one element and to a side surface of another element. In an embodiment, which may be in accordance with any of the preceding three embodiments, the both side surfaces of an element are in contact with the sliding fluid volume.

In an embodiment, which may be in accordance with any of the preceding embodiments, each of the elements of the plurality of elements is foldable in two with a radius of curvature of less than or equal to 10 mm, preferable less than or equal to 5 mm.

In an aspect, a bendable mobile electronic device comprises a display assembly as any of those specified above.

In an aspect, a bendable display assembly comprises a plurality of layered elements each having an area, the elements comprising a display element capable of displaying adjustable information; wherein two successive elements of the plurality of layered elements are forced, for a majority of their areas, towards each other by means of vacuum arranged in a sealed volume extending between the two successive elements, the sealed volume being enclosed by a sealing attached to at least one of the plurality of layered elements, whereby the two successive elements are slidably movable relative to each other when the display assembly is bent.

In an aspect, a method for manufacturing a bendable display assembly comprises: stacking a plurality of elements each having two side surfaces, each having an area, the elements comprising a display element capable of displaying adjustable information; and providing a sealed sliding fluid volume extending between two successive elements so that opposite side surfaces of the successive elements facing towards each other are, for a majority of their areas, in contact with the sealed sliding fluid volume, whereby the successive elements are slidably movable relative to each other when the display assembly is bent.

In an embodiment, providing a sealed sliding volume comprises forming a sealing attached to at least one of the plurality of elements, the sealing defining a volume for a sliding fluid, supplying sliding fluid into the volume for a sliding fluid, and closing the sealing.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Specific features of any of the examples and embodiments described above may be combined with any appropriate features of any of the other examples and embodiments described to form further examples or embodiments without losing the effect sought.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used in this specification to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A bendable display device, comprising:
a display element capable of displaying a visual output;
a plurality of layered elements comprising two successive elements having opposite side surfaces facing each other, the opposite side surfaces being in contact with only a sealed gas volume extending between the successive elements; and
a sealing affixed to the two successive elements and enclosing the sealed gas volume.

2. The bendable display device of claim 1, wherein the sealing comprises a bendable sealing portion in contact with one or more peripheries of the two successive elements to allow lateral movement of at least one of the two successive elements.

3. The bendable display device of claim 1, wherein the sealing comprises a bendable sealing portion in contact with one or more peripheries of the two successive elements to allow bending of the display element.

4. The bendable display device of claim 1, wherein the sealing comprises a bendable sealing portion and a non-bendable sealing portion in contact with one or more peripheries of the two successive elements.

5. The bendable display device of claim 1, wherein one of the two successive elements is the display element.

6. The bendable display device of claim 1, wherein the sealed gas volume is filled with a gas having a pressure less than atmospheric pressure.

7. The bendable display device of claim 6, wherein the gas in the sealed gas volume is less than the atmospheric pressure by 5-20%.

8. The bendable display device of claim 1, wherein the sealed gas volume is kept under pressure in a manner that generates one or more forces pulling the two successive elements toward each other.

9. The bendable display device of claim 1, wherein the sealed gas volume maintains an enclosed gas in a vacuum.

10. The bendable display device of claim 1, wherein the sealed gas volume comprises nitrogen.

11. The bendable display device of claim 1, wherein at least one of the two successive elements comprise a protective coating, and the sealed gas volume encloses air.

12. The bendable display device of claim 1, wherein the sealing is physically connected to peripheries of the two successive elements.

13. The bendable display device of claim 1, wherein the sealing is physically connected to a periphery of the sealed gas volume.

14. The bendable display device of claim 1, wherein the sealing is at least partially bendable to allow an edge of one of the two successive elements to move relative to a corresponding edge of the other one of the two successive elements when the two successive elements are bent.

15. The bendable display device of claim 1, wherein the sealing is formed from a layer of liquid optically clear adhesive ("LOCA") extending at an edge of the display assembly vertically over peripheral edge surfaces of the two successive elements.

16. The bendable display device of claim 1, wherein the two successive elements are foldable in two with a radius of curvature of less than or equal to 10 mm.

17. A bendable display device, comprising:
a display element capable of displaying a visual output;
a plurality of layered elements comprising two successive elements having opposite side surfaces facing each other, the opposite side surfaces being in contact with only a sealed gas volume extending between the successive elements; and
a sealing affixed to the two successive elements and enclosing the sealed gas volume, wherein the sealing comprises a flexible sealing portion that enables the display element to bend.

18. The bendable display device of claim 17, wherein the two successive elements are foldable in two with a radius of curvature of less than or equal to 10 mm.

19. A bendable display assembly comprising:
- a plurality of layered elements comprising a display element capable of displaying adjustable information and two successive elements having opposite side surfaces facing each other, the opposite side surfaces being in contact with only a sealed gas volume extending between the two successive elements; and
- a sealing affixed to the two successive elements and enclosing the sealed gas volume, wherein the sealing comprises a flexible sealing portion that enables the display element to bend.

20. The bendable display assembly of claim 19, wherein bending of the display element causes the two successive elements to correspondingly bend in a manner such that a first of the two successive elements extends laterally beyond a second of the two successive elements.

* * * * *